US012655653B2

(12) United States Patent

Sundarakrishnamachari et al.

(10) Patent No.: US 12,655,653 B2
(45) Date of Patent: Jun. 16, 2026

(54) CONNECTOR ASSEMBLY AND RELATED METHODS

(71) Applicant: Aptiv Technologies AG, Schaffhausen (CH)

(72) Inventors: Rangarajan Sundarakrishnamachari, Royapettah (IN); Kevin Turner, Vienna, OH (US); Abhaya Kishore, Nagercoil (IN)

(73) Assignee: Aptiv Technologies AG, Schaffhausen (CH)

( * ) Notice: Subject to any disclaimer, the term of this patent is extended or adjusted under 35 U.S.C. 154(b) by 70 days.

(21) Appl. No.: 18/411,155

(22) Filed: Jan. 12, 2024

(65) Prior Publication Data

US 2025/0230683 A1 Jul. 17, 2025

(51) Int. Cl.
*H01R 13/00* (2006.01)
*E05B 9/08* (2006.01)

(52) U.S. Cl.
CPC ............. *E05B 9/084* (2013.01); *H01R 13/00* (2013.01)

(58) Field of Classification Search
CPC . H01R 13/6271; H01R 13/64; E05B 17/2015; E05B 9/084; E05B 15/008
USPC .............................. 469/135, 139, 140; 70/77
See application file for complete search history.

(56) References Cited

U.S. PATENT DOCUMENTS 4,556,264 A * 12/1985 Tanaka ............... H01R 13/4367 439/62
4,602,833 A * 7/1986 Grabbe ............ H01R 13/65912 439/514
5,051,100 A * 9/1991 Kato .................. H01R 13/4538 439/367
5,928,038 A * 7/1999 Berg .................. H01R 13/6272 439/752
6,004,158 A * 12/1999 Ward ................. H01R 13/6215 439/752
7,267,562 B2 * 9/2007 Katsuma .............. H01R 13/516 439/140
7,628,648 B1 * 12/2009 Tan Chin Yaw ... H01R 13/4365 439/595
8,038,455 B1 * 10/2011 Moraes .............. H01R 13/4538 439/140
8,075,325 B1 * 12/2011 Kao ................... H01R 13/5227 438/141
9,843,126 B1 * 12/2017 Irish ................... H01R 13/4362
(Continued)

OTHER PUBLICATIONS

Extended European Search Report for EP24206813.8 dated Mar. 19, 2025, 11 pages.

*Primary Examiner* — Kristina R Fulton
(74) *Attorney, Agent, or Firm* — Miller Johnson

(57) ABSTRACT

A connector assembly includes a connector body and a lock member. The connector body includes a plurality of walls, a locking arm, and an inner portion. The plurality of walls define a cavity configured to receive a terminal. The locking arm is coupled to a first wall of the plurality of walls and includes a first surface, a second surface opposite the first surface, and a lock tab extending from the first surface. The inner portion is disposed within the cavity. The lock member is removably-disposed within the cavity and defines an aperture configured to receive the terminal. In an assembled configuration, the locking arm inhibits removal of the lock member from the cavity, and the lock member is disposed between the lock tab and the inner portion.

19 Claims, 7 Drawing Sheets

(56) References Cited

U.S. PATENT DOCUMENTS

| | | | | |
|---|---|---|---|---|
| 9,887,490 | B2 * | 2/2018 | Matsuura | H01R 13/64 |
| 10,498,066 | B1 * | 12/2019 | Sundarakrishnamachari | H01R 13/4538 |
| 10,566,728 | B1 * | 2/2020 | Sundarakrishnamachari | H01R 13/6278 |
| 10,714,860 | B2 * | 7/2020 | Washio | B60R 16/0207 |
| 10,897,103 | B1 * | 1/2021 | Sundarakrishnamachari | H01R 13/4365 |
| 10,938,138 | B2 * | 3/2021 | Lehmann | H01R 13/64 |
| 11,245,219 | B2 | 2/2022 | Shimizu | |
| 11,251,550 | B1 * | 2/2022 | Davidsz | H01R 13/516 |
| 11,264,747 | B2 * | 3/2022 | Yang | H01R 13/62922 |
| 11,316,288 | B2 * | 4/2022 | Urbaniak | H01R 13/506 |
| 11,342,708 | B2 * | 5/2022 | Menez | H01R 13/641 |
| 11,394,151 | B2 * | 7/2022 | Sundarakrishnamachari | H01R 13/424 |
| 11,552,426 | B1 * | 1/2023 | Sundarakrishnamachari | H01R 13/4538 |
| 11,705,659 | B2 * | 7/2023 | Sundarakrishnamachari | H01R 43/20 439/626 |
| 11,881,650 | B2 * | 1/2024 | Sundarakrishnamachari | H01R 13/424 |
| 12,266,885 | B2 * | 4/2025 | Delgadillo | H01R 13/521 |
| 12,300,933 | B2 * | 5/2025 | K T | H01R 13/6272 |
| 2001/0002346 | A1 * | 5/2001 | Kodaira | H01M 50/216 439/500 |
| 2001/0016457 | A1 * | 8/2001 | Taguchi | H01R 13/4367 439/752 |
| 2003/0008557 | A1 * | 1/2003 | Suzuki | H01R 13/4362 439/595 |
| 2006/0040536 | A1 * | 2/2006 | Putnam | H01R 13/62977 439/157 |
| 2008/0064252 | A1 * | 3/2008 | Nakamura | H01R 13/6633 439/135 |
| 2009/0042445 | A1 * | 2/2009 | Ichio | H01R 13/4361 324/538 |
| 2010/0178791 | A1 * | 7/2010 | Komiyama | H01R 13/62977 439/347 |
| 2011/0217859 | A1 * | 9/2011 | Kimura | H01R 13/5208 439/271 |
| 2012/0146764 | A1 * | 6/2012 | Kitchen | G07C 9/33 70/77 |
| 2012/0196465 | A1 * | 8/2012 | Stausser | H01R 13/4362 439/282 |
| 2014/0073190 | A1 * | 3/2014 | Zhao | H01R 13/6594 29/883 |
| 2014/0295708 | A1 * | 10/2014 | Omori | H01R 13/5208 439/626 |
| 2014/0364007 | A1 * | 12/2014 | Wang | H01R 13/6596 439/626 |
| 2015/0140847 | A1 * | 5/2015 | Kanemura | H01R 13/62938 439/259 |
| 2017/0288334 | A1 * | 10/2017 | Moriyasu | H01R 24/20 |
| 2017/0365950 | A1 * | 12/2017 | Matsuura | H01R 13/64 |
| 2018/0342828 | A1 * | 11/2018 | Kobayashi | H01R 13/5208 |
| 2019/0157797 | A1 * | 5/2019 | McDowell | H01R 13/506 |
| 2020/0227871 | A1 | 7/2020 | Kobayashi | |
| 2022/0109262 | A1 * | 4/2022 | Sundarakrishnamachari | H01R 43/00 |
| 2022/0200189 | A1 * | 6/2022 | Sundarakrishnamachari | H01R 13/424 |
| 2022/0209464 | A1 * | 6/2022 | Schneider | H01R 13/641 |
| 2022/0407262 | A1 * | 12/2022 | Sundarakrishnamachari | H01R 13/5219 |
| 2023/0094337 | A1 * | 3/2023 | Jung | H01R 13/44 439/493 |
| 2023/0246379 | A1 * | 8/2023 | Kopelos | H01R 43/20 439/639 |
| 2023/0253735 | A1 * | 8/2023 | Sundarakrishnamachari | H01R 13/4223 439/304 |
| 2025/0149829 | A1 * | 5/2025 | Oka | H01R 13/64 |
| 2025/0158332 | A1 * | 5/2025 | Wang | H01R 13/665 |

* cited by examiner

CONNECTOR ASSEMBLY AND RELATED METHODS

FIELD

The present disclosure relates to a connector assembly and more particularly to a connector assembly having a connector housing lock for securing an independent secondary lock.

BACKGROUND

Modern vehicles (e.g., automobiles) rely on electrical wiring and electrical connections to facilitate communication between various electronic components within the vehicle. Connection systems (e.g., connectors and terminals) play an important role in ensuring the integrity of these electrical connections and the reliability and performance of the vehicle. Conventional connection systems typically include a housing and one or more terminals designed to make contact and establish electrical pathways with terminals located in a mating connector housing.

Ensuring the secure engagement and retention of terminals within the connector housing, and the secure engagement and retention between components (e.g., seals, terminal and connector position assurance pieces, etc.) within and/or between the connector housings, is crucial for maintaining a reliable electrical connection. Some connection systems utilize mechanisms such as locking clips, levers, or additional components designed to engage terminals and/or components within the connector housing. While providing increased retention, these solutions often add complexity, cost, and assembly challenges to the connector design.

In view of the foregoing, while known mechanisms for securing terminals and/or components within the connector housing have proven acceptable for their intended purpose, a continuous need for improvement remains in the pertinent art to address the challenges associated with connection system assembly.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

One aspect of the disclosure provides a connector assembly. The connector assembly includes a connector body and a lock member. The connector body includes a plurality of walls, a locking arm, and an inner portion. The plurality of walls define a cavity configured to receive a terminal. The locking arm is coupled to a first wall of the plurality of walls and includes a first surface, a second surface opposite the first surface, and a lock tab extending from the first surface. The inner portion is disposed within the cavity. The lock member is removably-disposed within the cavity and defines an aperture configured to receive the terminal. In an assembled configuration, the locking arm inhibits removal of the lock member from the cavity, and the lock member is disposed between the lock tab and the inner portion.

Another aspect of the disclosure provides a connector assembly. The connector assembly includes a connector body and a lock member. The connector body includes a plurality of walls and a locking arm. The plurality of walls define a cavity. The locking arm is coupled to a wall of the plurality of walls and includes a lock tab. The lock member is removably-disposed within the cavity and defines an aperture configured to receive a terminal. The lock member is configured to inhibit the terminal from moving relative to the connector body. The locking arm is configured to inhibit removal of the lock member from the cavity.

Yet another aspect of the disclosure provides a method of assembling a connector assembly. The method includes disposing a lock member in a cavity of a connector body. The method includes inhibiting removal of the lock member from the cavity via a locking arm of the connector body. The method includes disposing an inner housing in the cavity, including: engaging the inner housing with the lock member, and applying a force to the inner housing to move the lock member and the inner housing within the cavity to engage (i) the lock member with an inner portion of the connector body and (ii) the inner housing with the locking arm. The method includes inhibiting removal of the inner housing from the cavity via the locking arm.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

One aspect of the disclosure provides a system and method for securing a location of an independent secondary lock (ISL) relative to a connector housing. In particular, the connector housing may include a lock for securing the location of the ISL relative to the connector housing until an additional connector housing is coupled to the connector housing. In some implementations, the connector housing is an outer connector housing and the additional connector housing is an inner housing that is inserted into the outer connector housing. In some implementations, the connector housing includes one or more lock arms to engage with the additional connector housing. During an assembly process, the connector housing may guide the ISL as it is inserted into the connector housing and engages with the one or more lock arms of the connector housing. In particular, the ISL may engage the one or more lock arms in the connector housing before reaching a bottom surface of the connector housing. The one or more lock arms may secure the ISL in a location and prevent it from falling out of the connector housing. When the additional connector housing is inserted into the connector housing, the additional connector housing may push the ISL to the bottom surface of the connector housing and the one or more lock arms may engage the additional connector housing.

Figure 1:
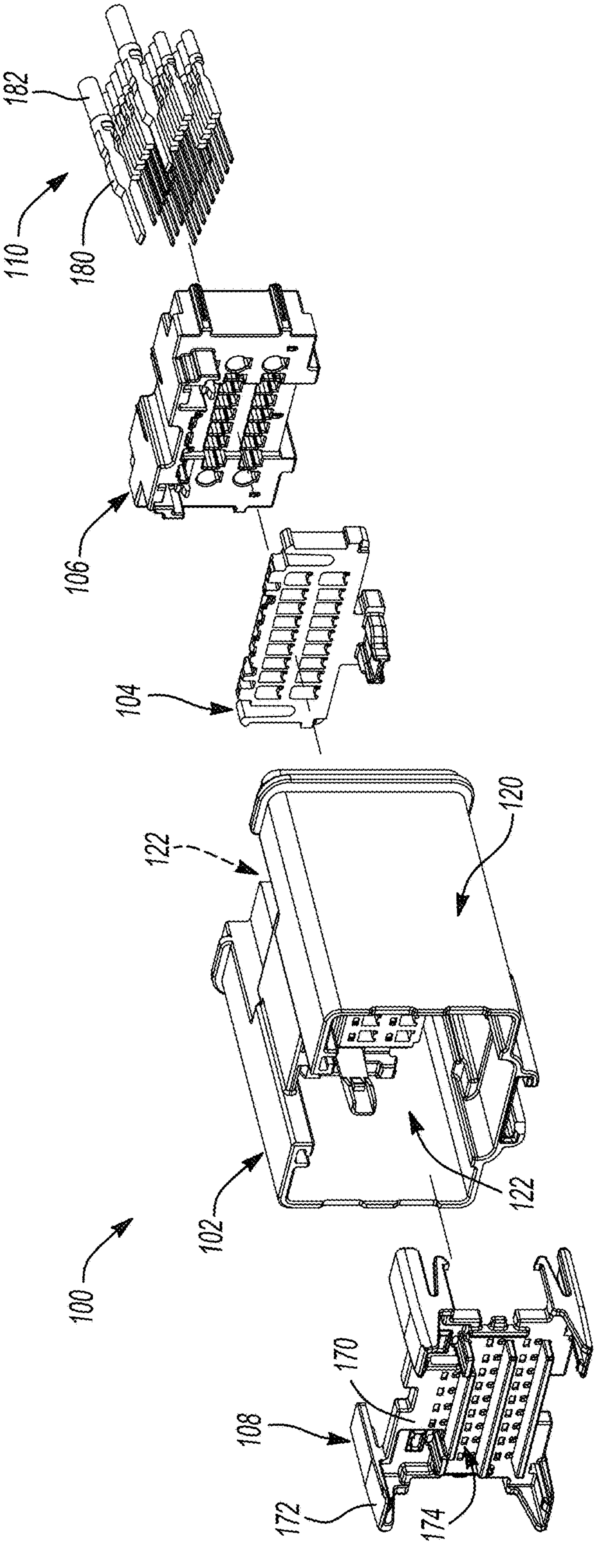
FIG. 1 is a front exploded view of a connector assembly in accordance with the principles of the present disclosure.
Figure 2:
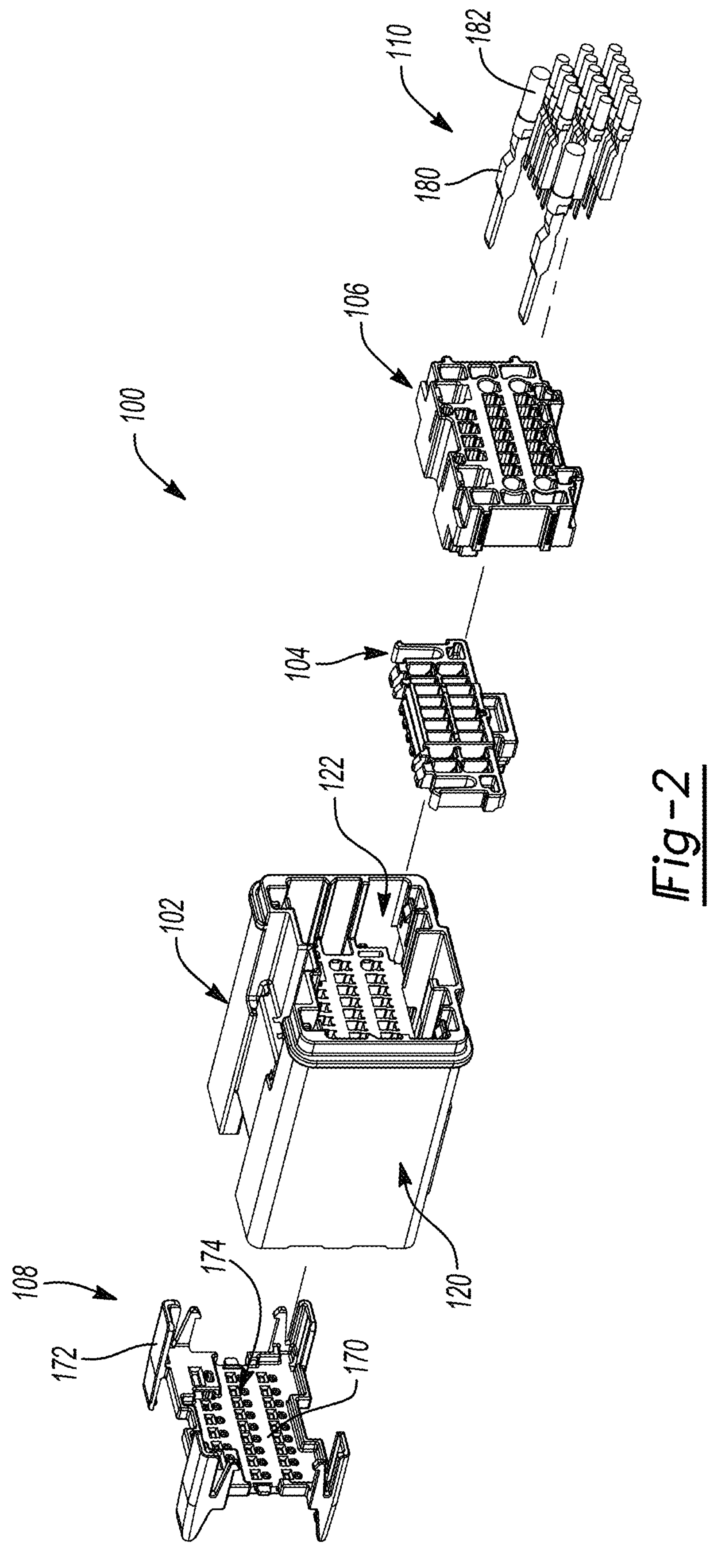
FIG. 2 is a rear exploded view of the connector assembly of FIG. 1.

With reference to FIGS. 1 and 2, an example connector assembly 100 is shown. As will be explained in more detail below, the connector assembly 100 may be installed in a vehicle (e.g., an automobile) to facilitate the transmission of electricity between various electronic components within the vehicle. For example, the connector assembly 100 may be a male connector detachably coupled to a mating connector (e.g., a female connector, not shown) such that, during operation, of the vehicle, electricity is transmitted between the connector assemblies and to various electronic components within the vehicle.

In various implementations, the connector assembly 100 includes a connector body 102, a lock member 104, an inner housing 106, a terminal stabilizer 108, and/or a plurality of terminal assemblies 110, among others. The connector body 102 includes a plurality of walls 120 that define a cavity 122. The lock member 104, the inner housing 106, and the terminal stabilizer 108 are removably-disposed in the cavity 122.

Connector Body

Figure 3:
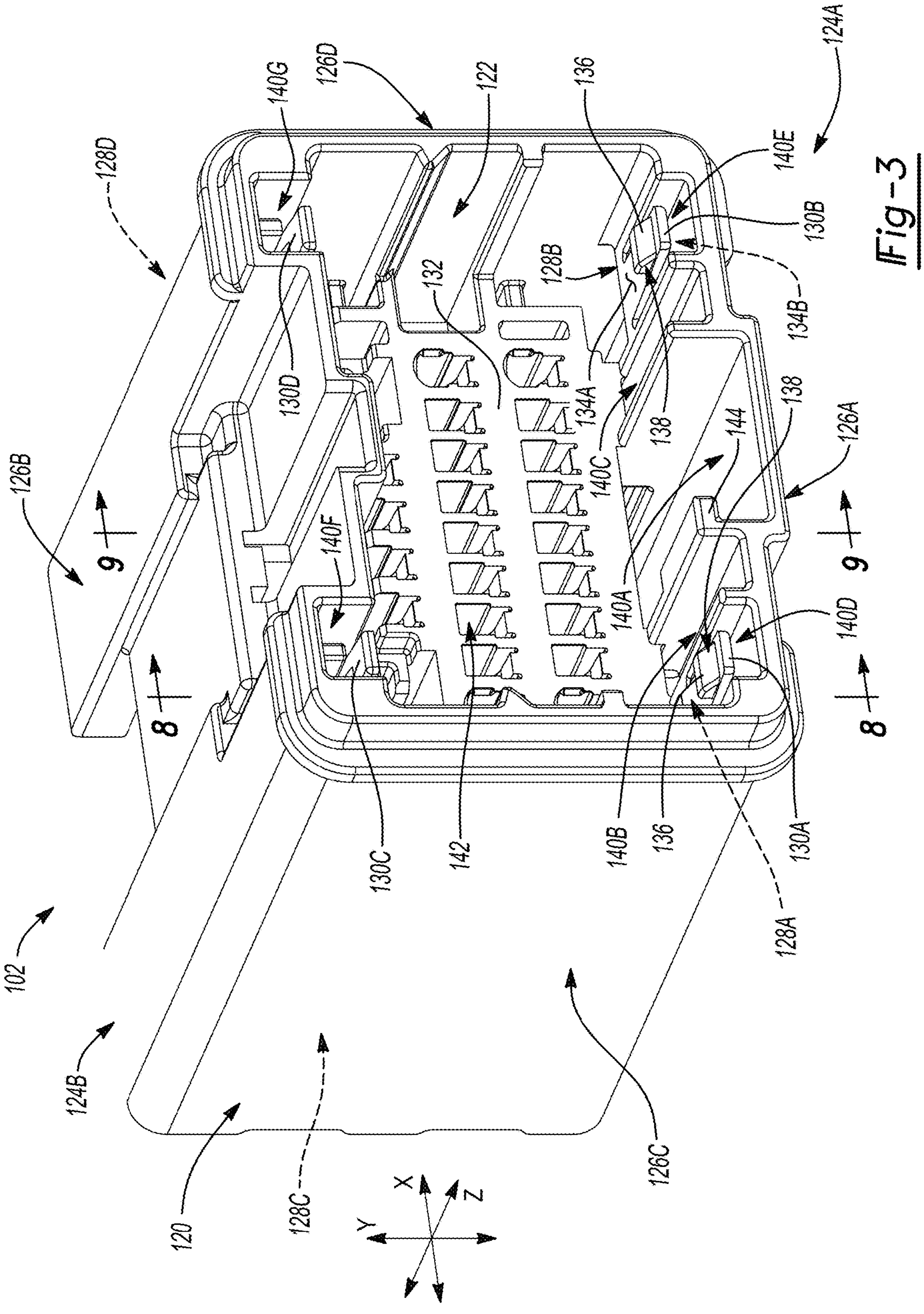
FIG. 3 is a perspective view of a connector body of a connector assembly in accordance with the principles of the present disclosure.

With reference to FIG. 3, an example connector body 102 is shown. In various implementations, the connector body 102 includes a first end 124A, a second end 124B, a first sidewall 126A, a second sidewall 126B, a third sidewall 126C, a fourth sidewall 126D, a first interior wall 128A, a second interior wall 128B, a third interior wall 128C, a fourth interior wall 128D, a first locking arm 130A, a second locking arm 130B, a third locking arm 130C, a fourth locking arm 130D, and an inner portion 132, among others. The second end 124B may be spaced apart from (e.g., opposite) the first end 124A. The first sidewall 126A may be disposed between the first end 124A and the second end 124B. The second sidewall 126B may be spaced apart from (e.g., opposite) the first sidewall 126A. The third sidewall 126C may be disposed between the first sidewall 126A and the second sidewall 126B. The fourth sidewall 126D may be spaced apart from (e.g., opposite) the third sidewall 126C. The first interior wall 128A may extend from the first sidewall 126A. The second interior wall 128B may extend from the first sidewall 126A. The third interior wall 128C may extend from the second sidewall 126B. The fourth interior wall 128D may extend from the second sidewall 126B. The first locking arm 130A may be coupled to the first interior wall 128A. The second locking arm 130B may be coupled to the second interior wall 128B. The third locking arm 130C may be coupled to the third interior wall 128C. The fourth locking arm 130D may be coupled to the fourth interior wall 128D.

In various implementations, the first sidewall 126A, the second sidewall 126B, the third sidewall 126C, and the fourth sidewall 126D define the cavity 122. The cavity 122 may be accessible via the first end 124A and/or the second end 124B of the connector body 102. The cavity 122 receives the lock member 104, the inner housing 106, the terminal stabilizer 108, and/or the terminal assemblies 110, among others.

With continued reference to FIG. 3, each locking arm (e.g., locking arms 130A-130D) may include a first surface 134A, a second surface 134B, and a lock tab 136. The second surface 134B may be opposite the first surface 134A. The lock tab 136 may extend from the first surface 134A. In some example configurations, the lock tab 136 includes a ramped portion 138.

As will be explained in more detail below, one or more of the locking arms 130A-130D may be flexible such that at least one of the locking arms 130A-130D may allow the insertion of, and/or inhibit the removal of, the lock member 104 from the cavity 122 during assembly of the connector assembly 100. In some examples, the first locking arm 130A and the second locking arm 130B inhibit the removal of the lock member 104 from the cavity during assembly of the connector assembly 100. The connector body 102 is shown including four locking arms 130A-130D, however the connector body 102 may include more or less than four locking arms.

In various implementations, the first sidewall 126A of the connector body 102 may define a first channel 140A, a second channel 140B, and a third channel 140C. The first channel 140A may be disposed between the second channel 140B and the third channel 140C. The first channel 140A may receive a portion of the lock member 104. The second channel 140B and the third channel 140C may be disposed adjacent to the first channel 140A and may receive portions of the inner housing 106. The first channel 140A, the second channel 140B, and the third channel 140C may be accessible via the first end 124A of the connector body 102.

In various implementations, the first sidewall 126A and the first interior wall 128A may define a fourth channel 140D, the first sidewall 126A and the second interior wall 128B may define a fifth channel 140E, the second sidewall 126B and the third interior wall 128C may define a sixth channel 140F, and/or the second sidewall 126B and the fourth interior wall 128D may define a seventh channel 140G. In some example configurations, the first locking arm 130A may be at least partially disposed in the fourth channel 140D, the second locking arm 130B may be at least partially disposed in the fifth channel 140E, the third locking arm 130C may be at least partially disposed in the sixth channel 140F, and/or the fourth locking arm 130D may be at least partially disposed in the seventh channel 140G.

In various implementations, the inner portion 132 is disposed within the cavity 122. The inner portion 132 may be coupled to (e.g., integrally formed with) the first sidewall 126A, the second sidewall 126B, the third sidewall 124C, and/or the fourth sidewall 124D. The inner portion 132 may define a plurality of holes 142 (i.e., apertures) that receive portions of the terminal assembles 110 (e.g., terminals). As will be explained in more detail below, the inner portion 132 may inhibit removal of the terminal assemblies 110 from the cavity 122 (e.g., the holes 142) and/or may facilitate the connection and/or alignment of the terminal assembles 110 with corresponding terminal assemblies of the mating connector (not shown).

Lock Member

Figure 4:
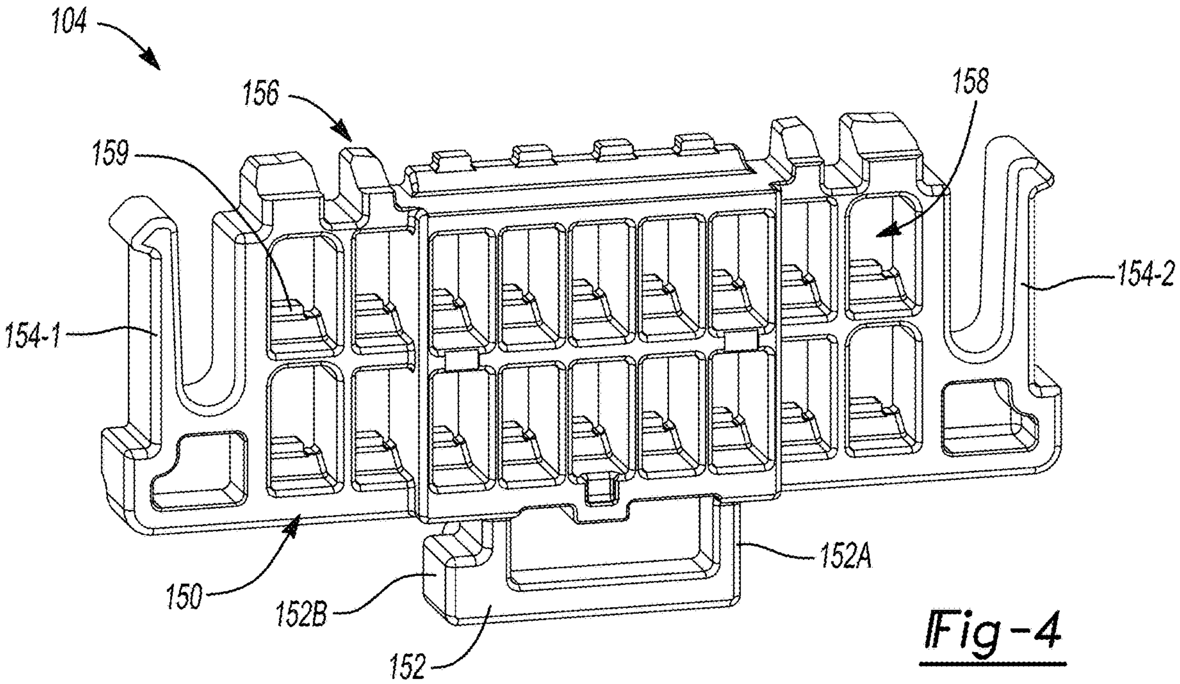
FIG. 4 is a perspective view of a lock member of a connector assembly in accordance with the principles of the present disclosure.

Referring now to FIG. 4, an example lock member 104 (i.e., an independent secondary lock (ISL)) is shown. In various implementations, the lock member 104 includes a first portion 150, a second portion 152, a first arm 154-1, a second arm 154-2, a plurality of protrusions 156, a plurality of apertures 158, and/or a plurality of nubs 159, among others. The second portion 152 may be coupled to the first portion 150. The second arm 154-2 may be coupled to the first portion 150. The plurality of protrusions 156 may extend from the first portion 150. In some examples, the first portion 150 defines the apertures 158. The first arm 154-1 and the second arm 154-2 may help facilitate the alignment of the lock member 104 in the cavity 122. For example, the first arm 154-1 and the second arm 154-2 may engage portions of the connector body 102 (e.g., the third sidewall 126C, the fourth sidewall 126D, etc.) to align the lock member 104 within the cavity 122.

In various implementations, the second portion 152 includes a main body portion 152A and a tab portion 152B. The main body portion 152A may extend from the first portion 150 in a first direction Y and may be received by the first channel 140A of the connector body 102. The tab portion 152B may extend from the main body portion 152A in a second direction X that is transverse to (e.g., orthogonal) the first direction Y and may be received by the first channel 140A of the connector body 102. For example, the tab portion 152B may be disposed under the lip 144 of the connector body 102 in the assembled configuration, such that the main body portion 152A inhibits movement (e.g., translation) of lock member 104 relative to the connector body 102 in the second direction X, while the tab portion 152B inhibits movement (e.g., translation) of lock member 104 relative to the connector body 102 in the first direction Y.

In various implementations, the protrusions 156 include various sizes and configurations and may extend from the first portion 150. In some example configurations, the protrusions 156 extend from the first portion 150 in a direction opposite the second portion 152. The protrusions 156 may help facilitate the alignment of the lock member 104 in the cavity 122. For example, the protrusions 156 may engage portions of the connector body 102 (e.g., the second sidewall 126B) and/or may be disposed in portions (e.g., voids, channels, etc.) defined by the connector body 102 to align the lock member 104 within the cavity 122.

In various implementations, the nubs 159 are disposed within the apertures 158. For example, a nub 159 may be disposed within each aperture 158. In the assembled configuration, the apertures 158 may receive portions of the terminal assemblies 110 (e.g., terminals). In various implementations, the lock member 104 inhibits removal of the terminal assemblies 110 from the cavity 122. For example, in the assembled configuration, the nubs 159 may engage a portion of the terminal assemblies 110 to inhibit removal thereof from the apertures 158

Figure 5:
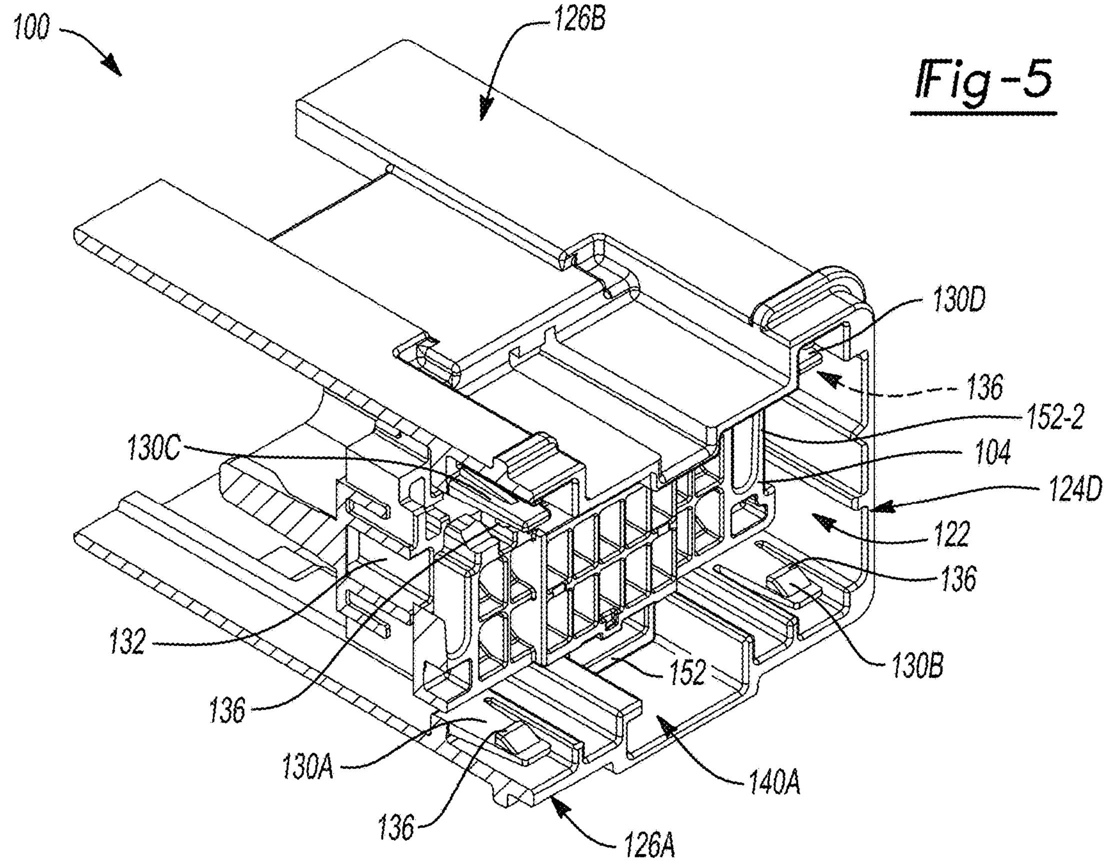
FIG. 5 is a perspective view of a connector assembly in a partial assembled configuration in accordance with the principles of the present disclosure.

With reference to FIG. 5, a partial assembled configuration of the connector assembly 100 is shown. In the partial assembled configuration, the lock member 104 is disposed in the cavity 122 of the connector body 102. The second portion 152 of the lock member 104 is disposed in the first channel 140A of the connector body 102. The lock member 104 is disposed between the inner portion 132 and the lock tabs 136 of the locking arms 130A-130D. The first locking arm 130A and/or the second locking arm 130B inhibit removal of the lock member 104 from the cavity 122.

Inner Housing

Figure 6:
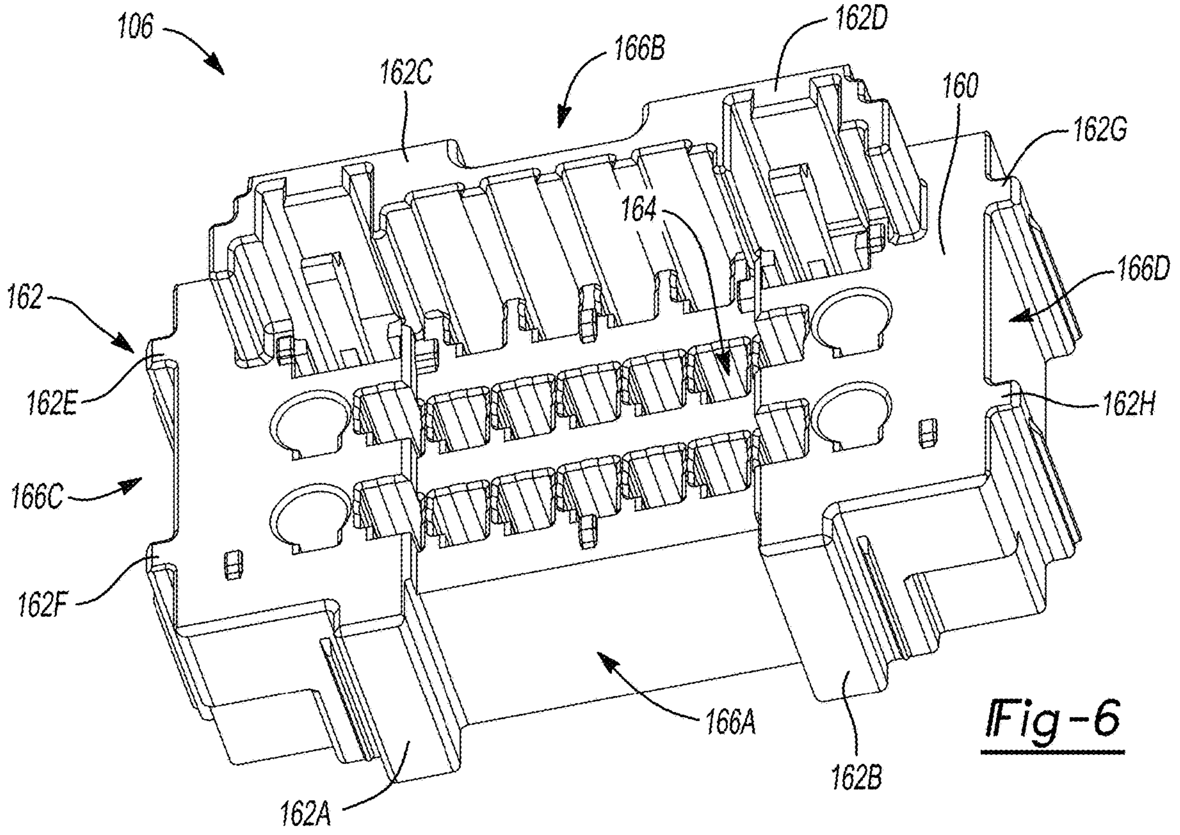
FIG. 6 is a perspective view of an inner housing of a connector assembly in accordance with the principles of the present disclosure.

Referring now to FIG. 6, an example inner housing 106 is shown. In various implementations, the inner housing 106 may include a main body 160, a plurality of projections 162, and/or a plurality of slots 164 (i.e., apertures), among others. In some examples, the main body 160 may include a first side 166A, a second side 166B spaced apart from the first side 166A, a third side 166C disposed between the first side 166A and the second side 166B, and a fourth side 166D spaced apart from the third side 166C.

In various implementations, the projections 162 may include various sizes and configurations and may extend from the main body 160. In some example configurations, a first projection 162A and a second projection 162B may extend from the first side 166A of the main body 160, a third projection 162C and a fourth projection 162D may extend from the second side 166B, a fifth projection 162E and a sixth projection 162F may extend from the third side 166C, and/or a seventh projection 162G and an eighth projection 162H may extend from the fourth side 166D.

In various implementations, the projections 162 may help facilitate the alignment of the inner housing 106 in the cavity 122 of the connector body 102. For example, the first projection 162A may be received by the second channel 140B of the connector body 102 and the second projection 162B may be received by the third channel 140C. The third projection 162C and the fourth projection 162D may engage portions of the connector body 102 (e.g., the second sidewall 126B) and/or may be disposed in portions (e.g., voids, channels, etc.) defined by the connector body 102 to align the inner housing 106 in the cavity 122. The fifth projection 162E and the sixth projection 162F may engage portions of the connector body 102 (e.g., the third sidewall 126C) and/or may be disposed in portions (e.g., voids, channels, etc.) defined by the connector body 102 to align the inner housing 106 in the cavity 122. The seventh projection 162G and the eighth projection 162H engage portions of the connector body 102 (e.g., the fourth sidewall 126D) and/or may be disposed in portions (e.g., voids, channels, etc.) defined by the connector body 102 to align the inner housing 106 in the cavity 122.

In various implementations, the slots 164 receive portions of the terminal assemblies 110 (e.g., terminals). In various implementations, the inner housing 106 inhibits removal of the terminal assemblies 110 from the cavity 122.

Terminal Stabilizer

Referring again to FIGS. 1 and 2, the terminal stabilizer 108 (i.e., blade stabilizer) may include a main body 170, a plurality of legs 172 coupled to the main body 170, and/or a plurality of apertures 174, among others. The terminal stabilizer 108 is received by the cavity 122 of the connector body 102. In various implementations, the main body 170 defines the apertures 174. The legs 172 may extend from the main body 160 and/or may help facilitate the alignment of the terminal stabilizer 108 in the cavity 122. For example, the legs 172 may engage portions of the connector body 102 (e.g., the first sidewall 126A, the second sidewall 126B, the third sidewall 126C, the fourth sidewall 126D, etc.) and/or may be disposed in portions (e.g., voids, channels, etc.) defined by the connector body 102 to align the terminal stabilizer in the cavity 122.

In various implementations, the apertures 174 may receive portions of the terminal assemblies of the mating connector (e.g., terminals). In various implementations, the terminal stabilizer 108 may inhibit removal of the terminal assemblies of the mating connector from the cavity 122 and/or may facilitate the connection and/or alignment of the terminal assemblies of the mating connector with corresponding terminal assembles 110.

Terminal Assemblies

Referring again to FIGS. 1 and 2, each of the terminal assemblies 110 may include a terminal 180 and one or more electrical wires 182 coupled to the terminal 180. The electrical wires 182 may be electrically connected with an electrical device, an electrical component, a battery, and/or a power source associated with the vehicle. In various implementations, the terminal 180 may connect with a corresponding terminal of the mating connected.

Assembled Configuration

Figure 7:
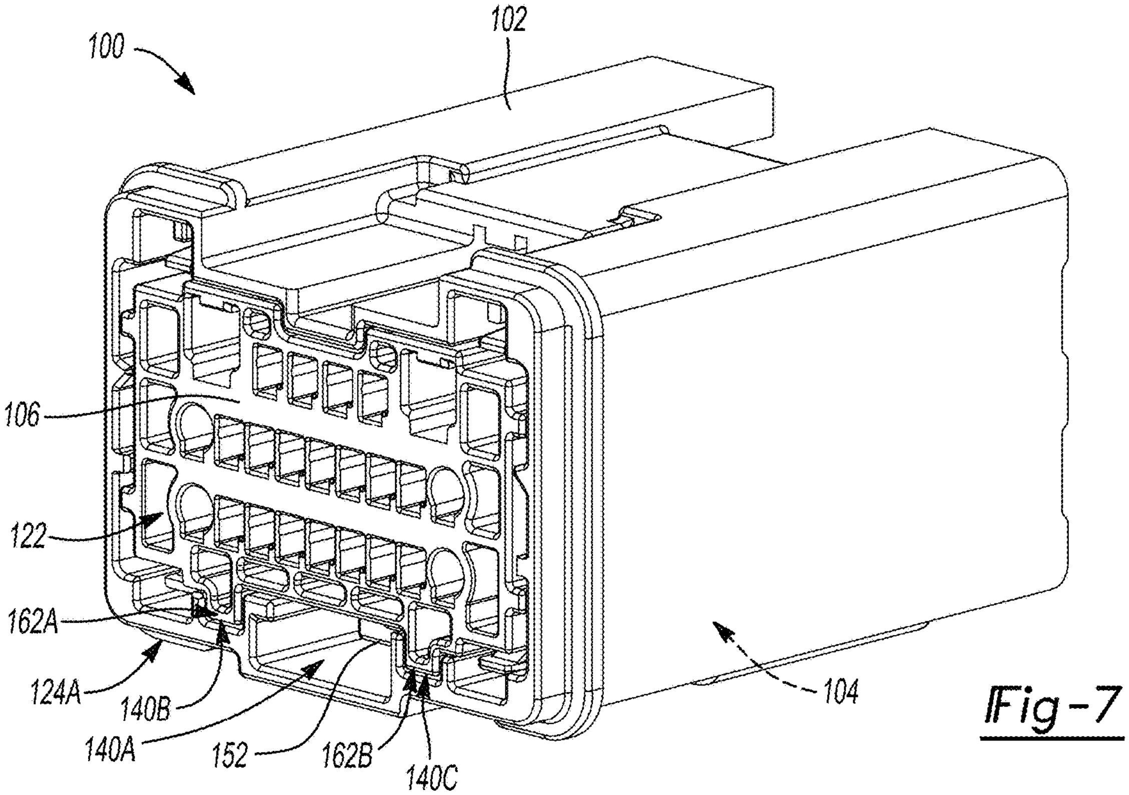
FIG. 7 is a perspective view of a connector assembly in an assembled configuration in accordance with the principles of the present disclosure.
Figure 8:
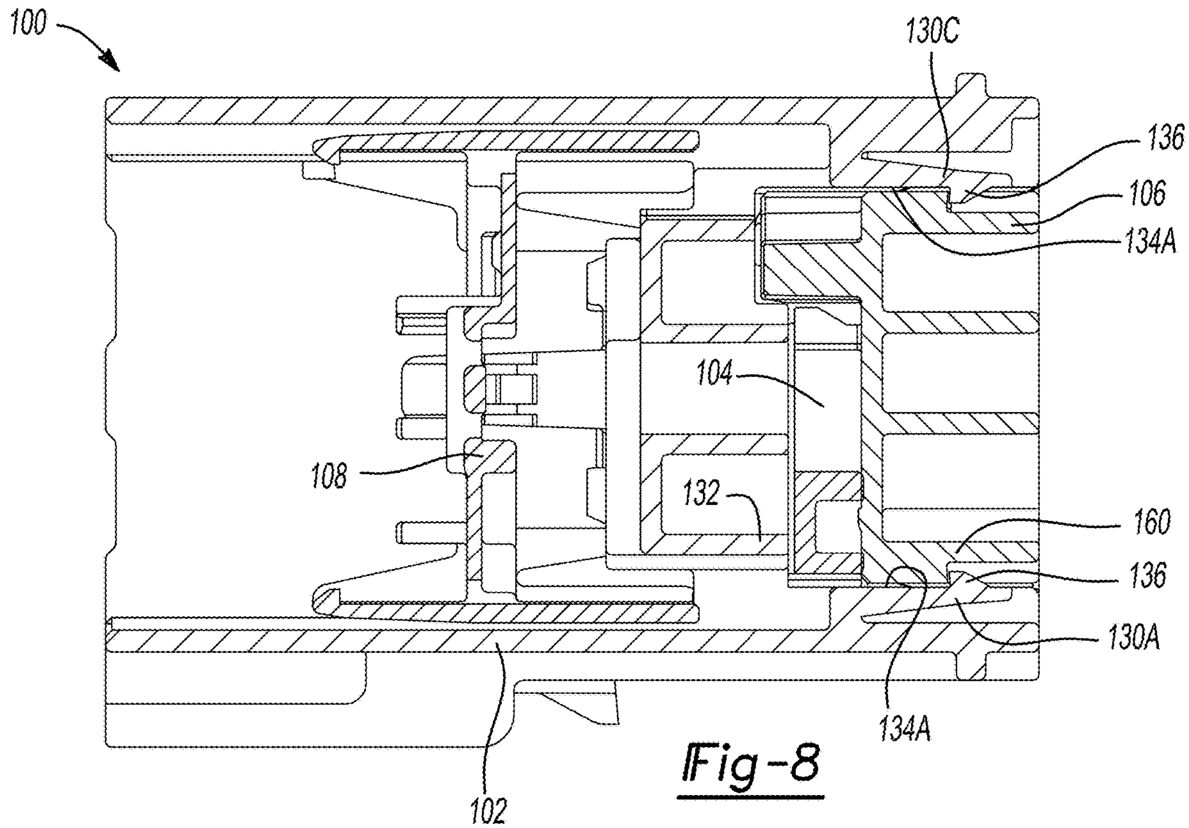
FIG. 8 is a cross-sectional view of a connector assembly in an assembled configuration in accordance with the principles of the present disclosure.
Figure 9:
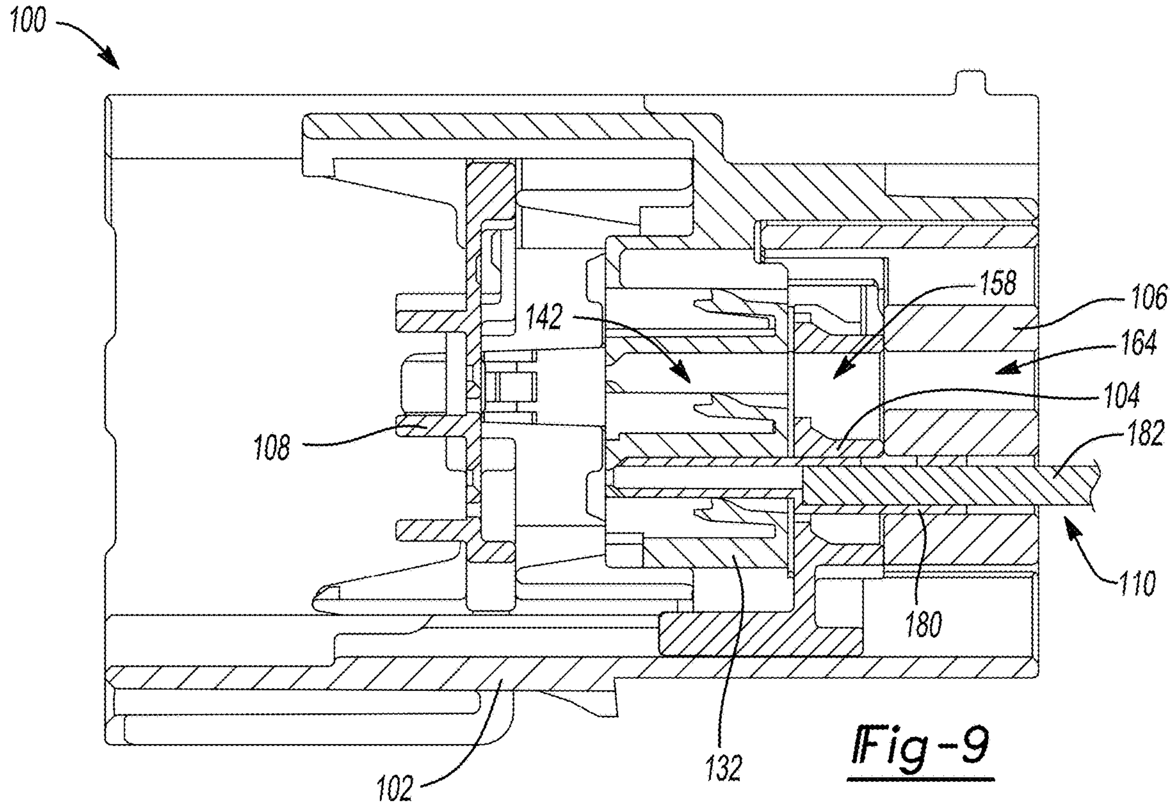
FIG. 9 is a cross-sectional view of a connector assembly in an assembled configuration in accordance with the principles of the present disclosure.

With reference to FIGS. 7-9, the connector assembly 100 is shown in an assembled configuration. In the assembled configuration, the lock member 104, the inner housing 106, the terminal stabilizer 108, and/or portions of the terminal assemblies 110 are disposed in the cavity 122 of the connector body 102. In various implementations, the lock member 104 is disposed between the inner portion 132 of the connector body 102 and the lock tabs 136 of the locking arms 130A-130D. The lock member 104 is disposed between the inner portion 132 and the inner housing 106 and is in contact with the inner portion 132 and the inner housing 106.

In various implementations, the inner portion 132 is disposed between the terminal stabilizer 108 and the lock member 104. In some example configurations, the second portion 152 of the lock member 104 is disposed in the first channel 140A of the connector body 102. The first projection 162A of the inner housing 106 is disposed in the second channel 140B of the connector body 102 and the second projection 162B of the inner housing 106 is disposed in the third channel 140C of the connector body 102. Portions of the main body 160 of the inner housing 106 engage the first surfaces 134A and the lock tabs 136 of the locking arms 130A-130D such that the locking arms 130A-130D inhibit removal of the inner housing 106 from the cavity 122.

In various implementations, the lock member 104 and the inner housing 106 are positioned in the cavity 122 such that apertures 158 of the lock member 104, the slots 164 of the inner housing 106, and the holes 142 of the inner portion 132 are aligned. Each of the terminals 180 of the terminal assemblies 110 is disposed in a respective aperture 158, a respective slot 164, and a respective hole 142.

Flowchart

Figure 10:
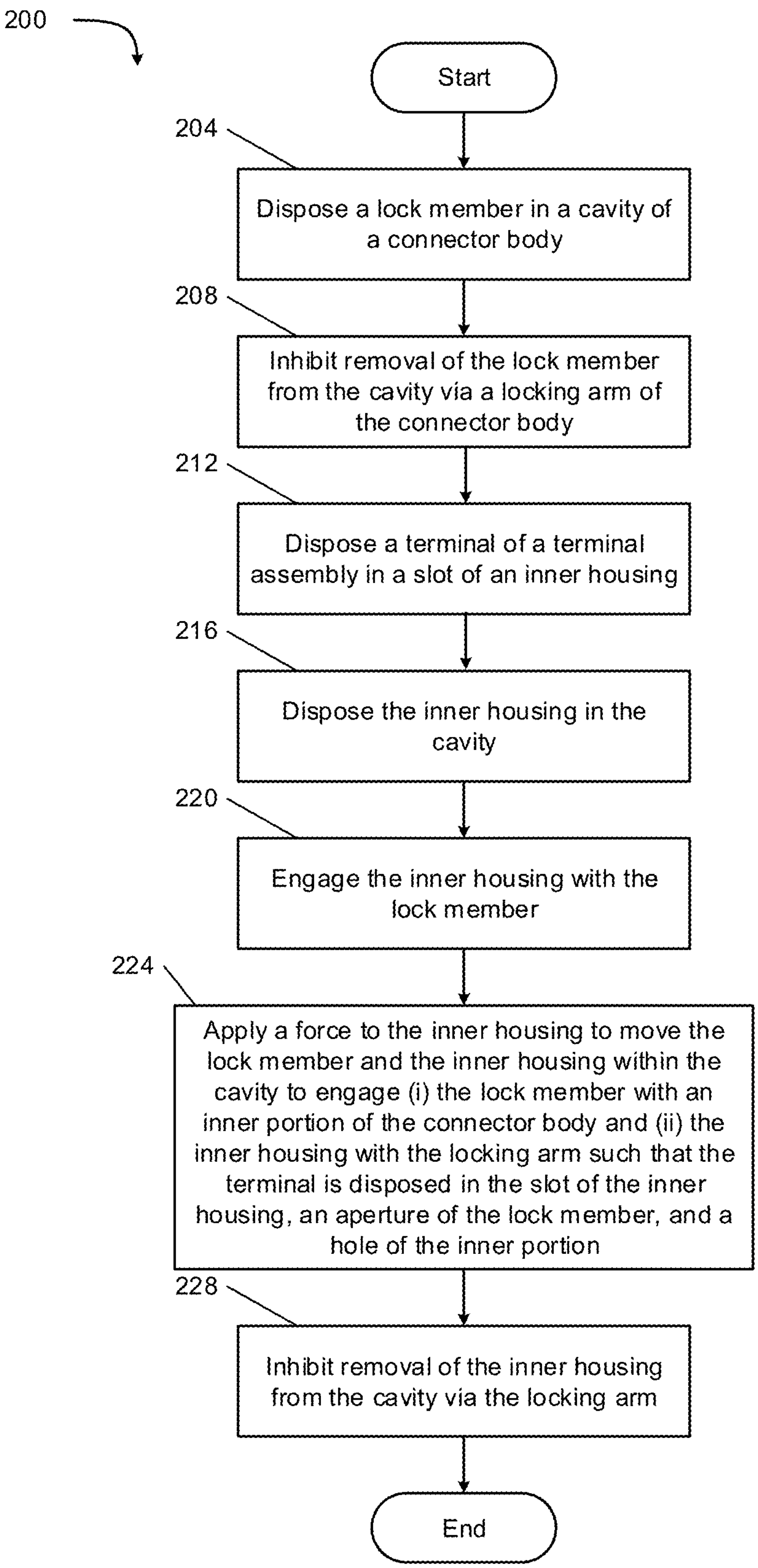
FIG. 10 is a flowchart depicting an example method for assembling a connector assembly in accordance with the principles of the present disclosure.

FIG. 10 is a flowchart of an example method 200 for assembling a connector assembly 100. The method 200 may begin at 204. At 204, a user may dispose a lock member 104 in a cavity 122 of a connector body 102. In some examples, disposing the lock member 104 in the cavity 122 may include disposing a portion of the lock member 104 (e.g., the second portion 152) in a channel (e.g., the first channel 140A) of a sidewall of the connector body 102 (e.g., the first sidewall 126A). For example, the lock member 104 may be inserted in the cavity 122 in a third direction Z (FIG. 3) that is transverse (e.g., orthogonal) to the first direction Y and the second direction Z. The method 200 may proceed to 208.

At 208, at least one locking arm (e.g., locking arm 130A, 130B) of the connector body 102 may inhibit removal of the lock member 104 from the cavity 122. The method 200 may proceed to 212. At 212, the user may dispose a terminal 180 of a terminal assembly 110 in a slot 164 of an inner housing 106. The method 200 may proceed to 216.

At 216, the user may dispose the inner housing 106 in the cavity 122. In some examples, disposing the inner housing 106 in the cavity 122 may include disposing a portion of the inner housing 106 (e.g., the first projection 162A, the second projection 162B, etc.) in a channel (e.g., the second channel 140B, the third channel 140C, etc.) defined by the sidewall of the connector body 102. The method 200 may proceed to 220.

At 220, the user may engage the inner housing 106 with the lock member 104. The method 200 may proceed to 224. At 224, the user may apply a force to the inner housing 106 to move the lock member 104 and the inner housing 106 within the cavity 122 to engage (i) the lock member 104 with an inner portion 132 of the connector body 102 and (ii) the inner housing 106 with at least one locking arm (e.g., locking arm 130A-130D) of the connector body 102 such that the terminal 180 is disposed in the slot 164 of the inner housing 106, an aperture 158 of the lock member 104, and a hole 142 of the inner portion 132. The method 200 may proceed to 228.

At 228, the at least one locking arm (e.g., locking arm 130A-130D) may inhibit removal of the inner housing 106 from the cavity 122. Then the method 200 may end.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship encompasses a direct relationship where no other intervening elements are present between the first and second elements as well as an indirect relationship where one or more intervening elements are present between the first and second elements. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The following Clauses provide an exemplary configuration for a connector assembly and related methods, as described above.

Clause 1: A connector assembly comprising: a connector body including a plurality of walls, a locking arm, and an inner portion, wherein: the plurality of walls define a cavity configured to receive a terminal, the locking arm is coupled to a first wall of the plurality of walls and includes a first surface, a second surface opposite the first surface, and a lock tab extending from the first surface, and the inner portion is disposed within the cavity; and a lock member removably-disposed within the cavity and defining an aperture configured to receive the terminal, wherein, in an assembled configuration: the locking arm inhibits removal of the lock member from the cavity, and the lock member is disposed between the lock tab and the inner portion.

Clause 2: The connector assembly of clause 1, further comprising an inner housing removably-disposed within the cavity, wherein, in the assembled configuration: the lock member is disposed between the inner portion and the inner housing, and the locking arm is configured to inhibit removal of the inner housing from the cavity.

Clause 3: The connector assembly of clause 2, wherein, in the assembled configuration, the first surface of the locking arm engages the inner housing.

Clause 4: The connector assembly of any of clauses 1 through 3, wherein: the plurality of walls of the connector body include a sidewall; the sidewall defines a first channel; and in the assembled configuration, a portion of the lock member is disposed in the first channel.

Clause 5: The connector assembly of clause 4, wherein: the first wall extends from the sidewall; the first wall and the sidewall define a second channel; and the locking arm is at least partially disposed in the second channel.

Clause 6: The connector assembly of clause 5, further comprising an inner housing removably-disposed within the cavity, wherein: the sidewall defines a third channel, the third channel is disposed between the first channel and the second channel, and in the assembled configuration, a portion of the inner housing is disposed in the third channel.

Clause 7: The connector assembly of any of clauses 1 through 6, further comprising an inner housing removably-disposed within the cavity, wherein: the inner housing defines a plurality of slots, the lock member defines a plurality of apertures, the inner portion defines a plurality of holes, and in the assembled configuration, the plurality of slots are aligned with the plurality of apertures and the plurality of holes such that a plurality of terminals are each disposed in a respective slot, a respective aperture, and a respective hole.

Clause 8: The connector assembly of any of clauses 1 through 7, wherein the lock tab of the locking arm includes a ramped portion.

Clause 9: The connector assembly of any of clauses 1 through 8, wherein the connector body includes a second locking arm having a second lock tab.

Clause 10: The connector assembly of clause 9, wherein: the plurality of walls include a first sidewall, a second sidewall opposite the first sidewall, and a second wall; the first wall extends from the first sidewall and the second wall extends from the second sidewall; and the second locking arm is coupled to the second wall.

Clause 11: The connector assembly of clause 10, wherein: the plurality of walls include a sidewall and a second wall; the first wall and the second wall extend from the sidewall; and the second locking arm is coupled to the second wall.

Clause 12: The connector assembly of any of clauses 1 through 11, further comprising a terminal stabilizer removably-disposed within the cavity, wherein, in the assembled configuration, the inner portion is disposed between the terminal stabilizer and the lock member.

Clause 13: A connector assembly comprising: a connector body including a plurality of walls and a locking arm, the plurality of walls defining a cavity, and the locking arm coupled to a wall of the plurality of walls and including a lock tab; and a lock member removably-disposed within the cavity and defining an aperture configured to receive a terminal, the lock member configured to inhibit the terminal from moving relative to the connector body, and the locking arm configured to inhibit removal of the lock member from the cavity.

Clause 14: The connector assembly of clause 13, wherein the connector body includes a plurality of locking arms.

Clause 15: The connector assembly of clause 13, further comprising an inner housing removably-disposed within the cavity, wherein: the connector body includes an inner portion, and in an assembled configuration, the lock member is disposed between the inner portion and the inner housing and the locking arm is configured to inhibit removal of the inner housing from the cavity.

Clause 16: The connector assembly of clause 15, wherein, in the assembled configuration, the lock member is in contact with the inner portion and the inner housing.

Clause 17: A method of assembling a connector assembly, the method comprising: disposing a lock member in a cavity of a connector body; inhibiting removal of the lock member from the cavity via a locking arm of the connector body; disposing an inner housing in the cavity, including: engaging the inner housing with the lock member, and applying a force to the inner housing to move the lock member and the inner housing within the cavity to engage (i) the lock member with an inner portion of the connector body and (ii) the inner housing with the locking arm; and inhibiting removal of the inner housing from the cavity via the locking arm.

Clause 18: The method of clause 17, wherein disposing the lock member in the cavity of the connector body includes disposing a portion of the lock member in a channel defined by a sidewall of the connector body.

Clause 19: The method of clause 18, wherein disposing the inner housing in the cavity includes disposing a portion of the inner housing in a second channel defined by the sidewall of the connector body.

Clause 20: The method of any clauses 17 through 19, further comprising inhibiting removal of the inner housing from the cavity via a second locking arm of the connector body.

What is claimed is:

1. A connector assembly comprising:
- a connector body including a plurality of walls, a locking arm, and an inner portion, wherein:
  - the plurality of walls define a cavity configured to receive a terminal,
  - the locking arm is coupled to a first wall of the plurality of walls and includes a first surface, a second surface opposite the first surface, and a lock tab extending from the first surface, and
  - the inner portion is disposed within the cavity;
- a lock member removably-disposed within the cavity and defining an aperture configured to receive the terminal; and
- an inner housing removably-disposed within the cavity, wherein:
  - the lock tab is configured to engage the lock member to inhibit removal of the lock member from the cavity during assembly of the connector assembly, and
  - in an assembled configuration:
    - the lock member is disposed between the lock tab and the inner portion,
    - the lock member is disposed between the inner portion and the inner housing, and
    - the lock tab is configured to engage the inner housing to inhibit removal of the inner housing from the cavity.

2. The connector assembly of claim 1 wherein, in the assembled configuration, the first surface of the locking arm engages the inner housing.

3. The connector assembly of claim 1 wherein:
- the plurality of walls of the connector body include a sidewall;
- the sidewall defines a first channel; and
- in the assembled configuration, a portion of the lock member is disposed in the first channel.

4. The connector assembly of claim 3 wherein:
- the first wall extends from the sidewall;
- the first wall and the sidewall define a second channel; and
- the locking arm is at least partially disposed in the second channel.

5. The connector assembly of claim 4 wherein:
- the sidewall defines a third channel,
- the third channel is disposed between the first channel and the second channel, and
- in the assembled configuration, a portion of the inner housing is disposed in the third channel.

6. The connector assembly of claim 1 wherein:
- the inner housing defines a plurality of slots,
- the lock member defines a plurality of apertures,
- the inner portion defines a plurality of holes, and
- in the assembled configuration, the plurality of slots are aligned with the plurality of apertures and the plurality of holes such that a plurality of terminals are each disposed in a respective slot, a respective aperture, and a respective hole.

7. The connector assembly of claim 1 wherein the lock tab of the locking arm includes a ramped portion.

8. The connector assembly of claim 1 wherein the connector body includes a second locking arm having a second lock tab.

9. The connector assembly of claim 8 wherein:
- the plurality of walls include a first sidewall, a second sidewall opposite the first sidewall, and a second wall;
- the first wall extends from the first sidewall and the second wall extends from the second sidewall; and
- the second locking arm is coupled to the second wall.

10. The connector assembly of claim 8 wherein:
- the plurality of walls include a sidewall and a second wall;
- the first wall and the second wall extend from the sidewall; and
- the second locking arm is coupled to the second wall.

11. The connector assembly of claim 1 further comprising a terminal stabilizer removably-disposed within the cavity,
- wherein, in the assembled configuration, the inner portion is disposed between the terminal stabilizer and the lock member.

12. A connector assembly comprising:
- a connector body including a plurality of walls and a locking arm, the plurality of walls defining a cavity, and the locking arm coupled to a wall of the plurality of walls and including a lock tab;
- a lock member removably-disposed within the cavity and defining an aperture configured to receive a terminal, the lock member configured to inhibit the terminal from moving relative to the connector body, and the locking arm configured to engage the lock member to inhibit removal of the lock member from the cavity during assembly of the connector assembly; and
- an inner housing removably-disposed within the cavity, the lock tab is configured to engage the inner housing to inhibit removal of the inner housing from the cavity in an assembled configuration.

13. The connector assembly of claim 12 wherein the connector body includes a plurality of locking arms.

14. The connector assembly of claim 12 wherein:
- the connector body includes an inner portion, and
- in the assembled configuration, the lock member is disposed between the inner portion and the inner housing.

15. The connector assembly of claim 14 wherein, in the assembled configuration, the lock member is in contact with the inner portion and the inner housing.

16. A method of assembling a connector assembly, the method comprising:

disposing a lock member in a cavity of a connector body;

inhibiting removal of the lock member from the cavity via a locking arm of the connector body by engaging the lock member with the locking arm, wherein the locking arm includes a lock tab;

disposing an inner housing in the cavity, including:

engaging the inner housing with the lock member, and applying a force to the inner housing to move the lock member and the inner housing within the cavity to engage (i) the lock member with an inner portion of the connector body and (ii) the inner housing with the locking arm; and inhibiting removal of the inner housing from the cavity via the locking arm by engaging the inner housing with the lock tab.

17. The method of claim 16 wherein disposing the lock member in the cavity of the connector body includes disposing a portion of the lock member in a channel defined by a sidewall of the connector body.

18. The method of claim 17 wherein disposing the inner housing in the cavity includes disposing a portion of the inner housing in a second channel defined by the sidewall of the connector body.

19. The method of claim 16 further comprising inhibiting removal of the inner housing from the cavity via a second locking arm of the connector body.

* * * * *